United States Patent Office 3,386,845

Patented June 4, 1968

1

3,386,845

AMINO SALTS OF DIMERIZED FATTY ACIDS USED AS AUXILIARIES FOR LACQUERS

Wilhelm Offermann, Dusseldorf, and Heinrich Linden, Dusseldorf-Holthausen, Germany, assignors to Dehydag Deutsche Hydrierwerke, G.m.b.H., Dusseldorf-Holthausen, Germany, a corporation of Germany No Drawing. Filed Nov. 16, 1965, Ser. No. 508,158
Claims priority, application Germany, Nov. 17, 1964, D 45,866; Nov. 18, 1964, D 45,878; Mar. 18, 1965, D 46,826
9 Claims. (Cl. 106—308)

ABSTRACT OF THE DISCLOSURE

Novel use of amine salts of dimerized fatty acids as agents of multiple effectiveness for influencing the characteristics of pigments in organic media. The universal usefulness of the products is manifested in that they have an extraordinary effect as sedimentation preventing agents, as auxiliary grinding agents as well as serving to prevent the pigments from "floating out."

PRIOR ART

To prevent the sedimentation of suspensions (e.g. lacquers, dyes and paints) of high specific weight pigments, such as barite, red lead, iron oxide red, micaceous iron and others, so-called suspension agents are used. The suspension agents are generally surface-active substances which are adsorbed by the pigment particles in a very thin layer on their surface and are capable of keeping the suspended particles more or less afloat. At the least, these suspension agents to a large extent, prevent the formation of hard, non-stirrable sediments. As suspension agents, metallic salts or the amino salts of fatty-, resinic-, naphthenic acids or other suitable carboxylic acids, salts of surface-active sulfuric acid derivatives, salts of pure sulfonic acids, salts of constant sulfuric acid semi-esters, have previously been used. Also high-molecular, wax-like substances, which for example, were obtained by the polymerization of alkylene oxides or by the action of several equivalent alkylene oxides on alcohols, glycols, carboxylic acids, dicarboxylic acids or hydroxy acids or else by partial esterification of dicarboxylic acids with bivalent alcohols have been used. Moreover, long-chain dialkyl esters of sulfosuccinic acid have been suggested to reduce sedimentation, but as yet have not been used in practice. While all of the aforementioned prior art suspension agents prevent sedimentation, in varying degrees, these agents are not considered effective for other purposes, such as grinding, etc.

The dispersion of pigments and fillers in organic media, that is, the desctruction of the agglomerates formed from the primary pigment grain is a necessary step in the preparation of paints. This process of dispersion, as a rule, is accomplished by milling or grinding with mechanical means such as roller mills, ball mills or equivalent machinery. To shorten the grinding time, various products have been added to the pigment pastes. These products, designated as "auxiliary grinding agents," are supposed to reduce the interfacial tension between the pigment grain and the organic media and thereby facilitate the dispersion of the pigment. Prior art workers have sought to use "auxiliary grinding agents" in a restrictive sense. That is, only to improve grinding, without any negative secondary action. As "auxiliary grinding agents" soy lecithin, zinc-naphthenate, salts of surface-active sulfuric acid derivatives, alkylene oxide adducts to alcohols, phenols and carboxylic acids, alkyl esters of sulfo succinic acid and nitrogen derivatives of natural fats such as N-coco-$\beta$-amino butyric acid, stearic propylene diamine dioleate were used.

2

The so-called "floating out" of pigments occurs frequently during the processing of paints which had been prepared with pigment mixtures. Fundamentally, two ways of "floating out" are differentiated here. These may be defined as floating out in "vertical direction" and floating out in "horizontal direction." The cause of the "floating out in vertical direction" (flooding), can be found in the different specific weights of the pigments used and in certain electrostatic conditions. It may be recognized, for example, by variations in the colorings between the moist and dry lacquer film as well as due to the development of colored streaks, when the paint is applied with the brush. Aside from that, there exists a "floating out in horizontal direction," which effect has been little clarified as to its causes. It manifests itself by the formation of agglomerates of the individual pigments in the paints, and it becomes visible in the dry lacquer film by the appearance of color spots: the so-called mottle effect. In particular in denser lacquer films colored hexagonal honeycombs, designated as "Benard cells," occur frequently on the edges. Both of these "floating out" phenomena are very disturbing lacquer problems and consequently many attempts have been made to prevent them by the concomitant use of various addition products. The oldest medium used to prevent "floating out" was soy lecithin, which, however, has an insufficient effect. In many cases "floating out" may be prevented by a thixotropic increase in viscosity, for example, with thickened castor oil. However, thixotropy is undesired for many lacquer dyes. Also, silicone oils and nitrogen derivatives of natural fats, such as stearic propylene diamine dioleate have been used to limit the "floating out" effect.

The behavior of pigments in organic media is determined by many factors, such as specific weight and nature of the pigments, pigment surface condition, size and shape of the pigment grain, nature and viscosity of the bonding agents, solvents and diluents as well as electrostatic charging phenomena. These large number of influences make it clear, that despite many efforts, no one as yet has succeeded in developing a medium which meets all of the functions combined. That is, no one has developed a medium incorporating therein an agent capable of satisfactorily functioning as a suspension agent, "auxiliary grinding agent" and also in preventing the "floating out" phenomena.

OBJECTS OF THE INVENTION

Accordingly, it is a primary object of this invention to provide universal agents for influencing the various characteristics of pigments in organic media.

Another object of this invention is to provide agents that act as anti-sedimentation agents, grinding agents and prevent the "floating out" effect of pigments in organic media.

A further object of this invention is to provide agents that are superior to the previously used substances in regard to total characteristics of pigments in organic media.

Another object of this invention is to provide agents that are superior to the previously used substances in regard to sedimentation, grinding and "floating out" of pigments in organic media.

These and other objects will become apparent as the disclosure continues.

THE INVENTION

Accordingly it has now been discovered, that amino salts of dimerized fatty acids are very favorably suitable as universal agents for influencing the characteristics of pigments in organic media, as they are far superior to the previously used substances in regard to the total characteristics required for such agents. It may be, that one or the other of the previously known products in one particular characteristic, as for example, preventing sedimentation in oil-lacquers or facilitating the grinding of certain pigments, may prove equivalent to the compounds of this invention, but none of them possess the universal suitability and the marked relationship to the usual lacquers and paints as do the amino salts of demerized fatty acids.

The preparation of the amino salts of dimerized fatty acids is accomplished according to generally known procedures. For example, the dimerized fatty acid is first heated to about 100 to 120° C. and an amount of amine, equimolar to the acid number of the dimerized fatty acid, is thereafter stirred into the dimerized fatty acid. The reaction mixture is allowed to stand at about 100 to 120° C. for 1 hour and thereafter diluted with suitable solvents.

The dimerized fatty acids, suitable for the preparation of the amino salts of this invention may be obtained according to known mehods by dimerization of mono- and multi-unsaturated fatty acids having a carbon chain of from 11 to 22 carbon atoms. The natural fatty acids, which are preferred, usually have 18 carbon atoms.

Suitable fatty acids are for example: undecylemic acid, palmito-oleic acid, oleic acid, elaidic acid, linoleic acid, erucic acid, brassidic acid as well as mixtures of fatty acds. The fatty acids may be obtained from products such as: olive oil, rapeseed oil, palm oil, peanut oil, animal oil, soy oil, cottonseed oil, safflower oil, tall oil, linseed oil and corn oil. Generally, commercial mixtures of dimerized fatty acids, contain from 15 to 25% of trimerics and higher polymers and small amounts of monomerics. Trimerics and high polymers, in amounts up to 25%, do not adversely effect the use of these commercial mixtures for purposes of this invention. However, monomerics in amounts over 3% should be removed. This can be conveniently accomplished due to their volatility.

As amine components the primary, secondary and tertiary aliphatic, cycloaliphatic and aromatic as well as heterocyclic, mono- and poly-nuclear amino bases may be utilized. The hydrocarbon radicals may also be substituted by alkyl, aryl and hydroxyl groups. When secondary and tertiary amines are used, the radicals present on the amino nitrogen may be identical or different. Aliphatic amines, containing from 12 to 18 carbon atoms are preferred. Among the suitable amines are those of the formula:

$$R_1-N\begin{matrix} \diagup R_2 \\ \diagdown R_3 \end{matrix}$$

wherein $R_1$ and $R_2$ are members selected from the group consisting of hydrogen, alkyl having from 1 to 22 carbon atoms, hydroxy-lower alkyl, amino-lower alkyl, alkylamino lower alkyl having from 3 to 25 carbon atoms, phenyl, cyclohexyl, and when taken together with the nitrogen, piperidino, morpholino, pipecolino and piperazino; and $R_3$ is a member selected from the group consisting of hydrogen, alkyl having from 1 to 22 carbon atoms and hydroxy-lower alkyl; and when $R_1$, $R_2$ and $R_3$ taken together with the nitrogen, pyridine, with the proviso that at least one of $R_1$, $R_2$ and $R_3$ is other than hydrogen.

Suitable amines are, for example: ethylamine, diethylamine, diethylenetriamine, propylenediamine, ethanolamine, triethanolamine, hexylamine, octylamine, isooctylamine, dodecylamine, octadecylamine, benzylamine, cyclo-hexylamine, aniline, piperidine, morpholine, pyridine and quinoline. Also amine mixtures, as they may be obtained from the fatty acids of natural fats, for example, the so-called cocoalkyl amine, representing an admixture of amines from coconut fatty acid with chain lengths of $C_{12}$ to $C_{18}$ are suitable. Other amines derived from fatty acids may also be used. Examples of amines with different hydrocarbon radicals are the dodecyldimethylamine, octadecyl-diethylamine, cyclohexylmethylamine, dicocoalkyl-ethylamine, dimethyl-cocalkylamine, cocoalkylpropylene-diamine.

The amine salts are used generally in the form of neutral salts, wherein each acid group of the dimeric fatty acid is neutralized by an amine radical. Of particular suitability are the amine salts, derived from primary aliphatic amines with 12 to 18 carbon atoms, and among them in turn those which were derived from the amine mixture designated as cocoalkyl-amine. The neutral cocoalkyl-amine salts are superior to the other products of this invention not only in regard to their effectiveness, but also in regard to their universal usability. Among the various neutral cocoalkyl-amine salts those of the dimerized soy oil- and cottonseed oil fatty acids exhibit the best effect.

The practical utilization of the agents of this invention in pigment suspensions, in particular lacquers and paints, for the purposes of preventing sedimentation and "floating out," is accomplished in the usual ways. The amine salts or the amine salt mixtures may be stirred, unblended or undiluted, into the processed lacquer, either before or after the dilution or the standardization of viscosity. The agents may also be worked in the form of high percent solutions or pastes. The fact that the amine salts or the amine salt mixtures of this invention are easily soluble in a series of slightly volatile organic solvents such as lower alcohols and aromatic hydrocarbons or mixtures thereof, is of definite advantage, as this allows an especially uniform adsorption by the pigment with the least mechanical energy expended. The agents of the present invention may also be processed together with the pigments prior to their introduction into the lacquer. This, too, gives satisfactory results.

To be used as auxiliary grinding agents the amine salts or amine salt mixtures may be stirred unblended or undiluted or else in high percent solution into the pigment pastes to be ground and thereafter the thus prepared pastes can be worked up into the final composition. A further possibility is dry or wet grinding with the pigments in the course of pigment preparation, whereby pre-treated pigments are obtained, which have to be admixed only with the required bonding agent to produce the final composition. This working method designated as "coating process" has become established already to a considerable extent in the pigment producing industry.

The quantities of the agents necessary to obtain satisfactory results may vary depending upon the nature and composition of the pigment and the characteristics and viscosity of the organic medium. Generally, amounts, in weight percent in the range of 0.05 to 5% and, preferably between 0.5 to 2%, based on the amount of pigment used are satisfactory.

The following are examples of the invention which are not to be construed as limitative in any respect.

Example I

Sedimentation preventing agents, listed in Table I in amounts of 1%, by weight, based on pigment, were worked into a low-viscose immersion base having the following composition:

| | Parts by weight |
|---|---|
| Short-chain alkyd resin oil with 25% oil constituent (Alkydal RD 18[1]), 75% solution in xylol | 40.0 |
| Modified urea-formaldehyde-resin (Plastopal CB[1]), 60% solution in xylol | 16.6 |
| Iron oxide red | 30.0 |
| Pure talc | 2.0 |
| Xylol | 27.6 |
| n-Butanol | 3.4 |
| Tetralin | 10.0 |
| Butylglycol | 2.0 |
| Benzylalcohol | 0.3 |
| Zinc naphthenate with 12% zinc (Soligen Zinc[1]) | 0.1 |

[1] Trademark.

The additions were made, in dissolved form, once to the prepared composition as set forth above and once to the pigment paste prior to roll milling. In both cases the results were the same and hence only one set of data is reported in Table I. The immersion base used had a viscosity of 30 to 35 seconds in the DIN (German Industrial Standardization) 4 beaker at 20° C.

The sediments which formed during the standing of the samples were measured by means of the "Wassmuth-Boller" method (Fats, Soaps, Paints, 1954, No. 2, pages 81–84) at pre-determined intervals and the results are recorded in Table I.

From the results recorded in Table I it is evident that the agents of the present invention (additives 5 to 15) are superior to the conventional additives in preventing sedimentation.

Example II

For the performance of a series of tests a heavily pigmented lacquer was used, into which the sedimentation preventing agents were worked in amounts of 1%, by weight, based on pigment, in the manner as described in Example I. The lacquer used had the following composition and a viscosity of about 75 seconds in a DIN 4 beaker at 20° C.

| | Parts by weight |
|---|---|
| Longchain alkyl resin oil with 67% linseed oil content (Alkydal L extra [1]), 60% in mineral spirits | 50.0 |
| Longchain alkyd resin oil with 64% linseed oil content (Alkydal 2 M 63 [1]), 100% | 11.5 |
| Maleinate resin (Aresate 313 c P [1]) 50% solution in xylol | 5.5 |
| Mineral spirits K30 [1] | 25.0 |
| Decalin | 3.2 |
| Dipentene | 3.2 |
| Dry cobalt-lead naphthenate (Soligen CO Pb [1]) | 0.3 |
| Titanium dioxide | 16.0 |
| Barite | 20.0 |
| Zinc chromate | 20.0 |
| Anti-skinning agent | 0.3 |

[1] Trademark.

The numerical values were obtained by measuring the deposits according to the "Wassmuth-Boller" method and are reported in Table II.

TABLE I

| | Load required to obtain the proper dispersion in grams After— | | | | | | |
|---|---|---|---|---|---|---|---|
| | 1 day | 3 days | 6 days | 14 days | 30 days | 60 days | 90 days |
| 1. Blank test without addition | 10 | 20 | 50 | 100 | >300 | (1) | (2) |
| 2. Triethanolamine salt of acid cetyalcohol sulfate | <10 | 10 | 20 | 30 | 100 | 180 | 300 |
| 3. Sodium salt of dioctylsulfo succinic acid | 10 | 20 | 30 | 50 | 150 | 200 | >300 |
| 4. Dioleate of fatty propylene diamine | 10 | 20 | 30 | 50 | 150 | 200 | >300 |
| 5. Neutral triethanolamine salt of dimerized oleic acid with a 16% trimeric content | <10 | 10 | 10 | 20 | 50 | 100 | <300 |
| 6. Neutral triethanolamine salt of dimerized acids of linseed oil with a 24% trimeric content | <10 | 10 | 10 | 20 | 50 | 80 | 250 |
| 7. Neutral triethanolamine salt of dimerized acids of soy oil with a 21% trimeric content | <10 | 10 | 10 | 20 | 40 | 70 | 230 |
| 8. Neutral diethylenetriamine salt of dimerized acids of soy oil with a 21% trimeric content | <10 | <10 | 10 | 20 | 30 | 50 | 200 |
| 9. Neutral benzylamine salt of dimerized acids of cottonseed oil with a 20% trimeric content | <10 | 10 | 10 | 20 | 50 | 100 | <300 |
| 10. Neutral diemethylcocoalkylamine salt of dimerized acids of soy oil with a 20% trimeric content | <10 | <10 | <10 | <10 | 10 | 20 | 190 |
| 11. Neutral cocoalkylamine salt of dimerized acids of soy oil with a 21% trimeric content | <10 | <10 | <10 | <10 | 10 | <20 | 150 |
| 12. Neutral cocoalkylamine salt of dimerized acids of cottonseed oil with a 20% trimeric content | <10 | <10 | <19 | <10 | 10 | 20 | 180 |
| 13. Acid cocoalkylamine salt of dimerized fatty acids of soy oil with a 21% trimeric content | <10 | 10 | 10 | 20 | 50 | 100 | 280 |
| 14. Neutral cyclohexylamine salt of dimerized fatty acids of cottonseed oil with a 20% trimeric content | <10 | 10 | 10 | 20 | 30 | 60 | 200 |
| 15. Neutral morpholine salt of dimerized fatty acids of soy oil with a 21% trimeric content | <10 | 10 | 10 | 20 | 40 | 70 | 220 |

[1] Compacted. [2] Cemented.

TABLE II

| | Load required to obtain the proper dispersion in grams after— | | | | | | | |
|---|---|---|---|---|---|---|---|---|
| | 1 day | 3 days | 6 days | 14 days | 30 days | 60 days | 90 days | 180 days |
| 1. Blank test without addition | 10 | >10 | 30 | 80 | 200 | >300 | (1) | (2) |
| 2. Triethanolamine salt of acid cetylalcohol sulfate | <10 | <10 | 10 | 10 | >10 | 20 | >20 | 30 |
| 3. Sodium salt of dioctylsulfosuccinic acid | <10 | 10 | >10 | 30 | 50 | 100 | 200 | 300 |
| 4. Dioleate of fatty propylene diamine | 10 | 10 | 20 | 50 | 100 | 200 | 300 | >300 |
| 5. Neutral triethanolamine salt of dimerized oleic acid with 16% trimeric content | <10 | 10 | >10 | 20 | 20 | 30 | 40 | 50 |
| 6. Neutral triethanolamine salt of dimerized acids of linseed oil with a 24% trimeric content | <10 | 10 | 10 | >10 | 20 | >20 | 30 | 40 |
| 7. Neutral triethanolamine salt of dimerized acids of soy oil with a 21% trimeric content | <10 | <10 | 10 | 10 | >10 | 20 | >20 | 30 |
| 8. Neutral diethylenetriamine salt of dimerized acids of soy oil with a 21% trimeric content | <10 | 10 | >10 | 20 | 30 | 40 | 50 | 50 |
| 9. Neutral benzylamine salt of dimerized acids of cottonseed oil with a 20% trimeric content | <10 | 10 | >10 | 20 | 30 | 40 | 50 | 50 |
| 10. Neutral dimethylcocoalkylamine salt of dimerized acids of soy oil with a 20% trimeric content | <10 | 10 | 10 | >10 | >10 | 20 | >20 | 30 |
| 11. Neutral cocoalkylamine salt of dimerized acids of soy oil with a 21% trimeric content | <10 | <10 | 10 | 10 | >10 | >10 | 20 | 20 |
| 12. Neutral cocoalkylamine salt of dimerized acids of cottonseed oil with a 20% trimeric content | <10 | <10 | 10 | 10 | >10 | >10 | 20 | >20 |
| 13. Acid cocoalkylamine salt of dimerized fatty acids of soy oil with a 21% trimeric content | <10 | 10 | 10 | >10 | 20 | 20 | 30 | 40 |
| 14. Neutral cyclohexylamine salt of dimerized fatty acids of cottonseed oil with a 20% trimeric content | <10 | <10 | 10 | >10 | 20 | >20 | 30 | 40 |
| 15. Neutral morpholine salt of dimerized fatty acids of soy oil with a 21% trimeric content | <10 | <10 | 10 | 10 | >10 | 20 | >20 | 30 |

[1] Compacted. [2] Cemented.

In addition to the sedimentation preventing effect of additives 5 to 15, as reported in Table II, it was also noted that the paints containing the additives of the present invention exhibited superior corrosion resistance. This was particularly true with regard to products 4, 8, 9, 10, 11, 12 and 14.

Example III

To study the effect of various agents of the present invention versus prior art products, as auxiliary grinding agents, defined mixtures of selected pigments were mixed with linseed oil and the additive to be studied. The mixtures were then ground on a three-roll mill. The time required to obtain a grain fineness of less than 10$\mu$ was determined. Normally several grinding passes are required for this purpose, that is to say the entire material to be ground has to pass through the rollers several times. Hence, the grinding time and the number of passes served as a measure of the effectiveness of each additive tested. The mill settings were maintained constant for all passes and the grain fineness was determined with the grindometer.

In order to do without the use of solvents in performing the grinding tests, and to effect better reproducibility, a commercial linseed oil with an acid number of 10.0 was used as the binding agent. The proportions of the individual pigments were varied according to the different oil absorption capacities of each pigment type.

The selection of suitable pigments was difficult as many commercial pigments are already pre-treated by the manufacturer and furthermore related data concerning the type and quantity of preconditioning agents is not available. Thus, pigments with a phthalocyanine basis as well as various carbon blacks, all of these being of considerable interest in this connection, have been found unsuitable on the strength of pre-tests, because all of the pigment samples of this type had been pretreated. After a number of pre-tests, the following were chosen to be tested from the group of pigments considered difficult to grind:

Miloriblue (Type RN 2823 of Siegle & Co.)
Manganese violet, an ammonium manganese phosphate (Type K 21 268 of Siegle & Co.)
Red azo dye based on 2-chloro-4-aminotoluene-5-sulfonic acid-$\beta$-oxynaphthoic acid (Sico-fast scarlet 22 M of Siegle & Co.)
Organic yellow pigment based on 3,3-dichloro-benzidine and acetic acid-m-xylidide (Benzydine-yellow GR of Siegle & Co.)

The pigments were stirred into the linseed oil varnish and the additive to be tested was added, in an amount of 1%, by weight, based on pigment.

For the first series of tests a paste consisting of 50 parts by weight of Milori blue and of 200 parts by weight of linseed oil varnish was used. Table III shows the results obtained:

TABLE III

| Grinding Agents | Required Grinding Passes | | | | Total grinding time in minutes | Evaluation* |
|---|---|---|---|---|---|---|
| | 1 | 2 | 3 | 4 | | |
| 1. Nonylphenol ethoxylated with 4 mols ethylene oxide | 7 Z; 60 K | 8 Z; 30 K | 8 Z; 20 K | 9 Z; 10 K | 31 | 3 |
| 2. Nonylphenol ethoxylated with 8–9 mols ethylene oxide | 6 Z; 55 K | 7 Z; 20 K | 7 Z; 15 K | 6 Z; 10 K | 26 | 2–3 |
| 3. Nonylphenol ethoxylated with 9 mols ethylene oxide and propoxylated with 10 mols of propylene oxide. | 7 Z; 55 K | 9 Z; 35 K | 7 Z; 25 K | 8 Z; 15 K | 31 | 3–4 |
| 4. Triethanolamine salt of acid cetylalcohol sulfate | 6 Z; 55 K | 7Z ; 35 K | 9 Z; 20 K | 10 Z; 10K | 32 | 3 |
| 5. N-cocoalkyl-$\beta$-amino butyric acid | 7 Z; 35 K | 6.5 Z; 30 K | 7 Z; 10 K | | 20.5 | 1 |
| 6. Tallow propylene diamine dioleate | 8 Z; 40 K | 8.5 Z; 30 K | 8.5 Z; 10 K | | 25 | 2 |
| 7. Neutral cocoalkyl-amine salt of dimerized acids of soy oil with a 21% trimeric content. | 6.5 Z; 30 K | 7 Z: 25 K | 6.5 Z; 10 K | | 20 | 1 |
| 8. Neutral cocoalkyl-amine salt of dimerized acids of cottonseed oil with a 20% trimeric content. | 7 Z; 35 K | 7 Z; 30 K | 7 Z; 10 K | | 21 | 1 |
| 9. Acid cocoalkyl-amine of dimerized acids of soy oil with a 21% trimeric content. | 6 Z; 50 K | 6 Z; 35 K | 6 Z; 25 K | 8 Z; 10 K | 26 | 2–3 |
| 10. Neutral dimethyl cocoalkyl-amine salt of dimerized acids of soy oil with a 21% trimeric content. | 6 Z; 35 K | 7 Z; 30 K | 8 Z; 10 K | | 21 | 1 |
| 11. Neutral benzylamine salt of dimerized acids of cottonseed oil with a 20% trimeric content. | 5 Z; 50 K | 6 Z; 35 K | 7 Z; 25 K | 6 Z; 10 K | 24 | 2 |
| 12. Neutral diethylene triamine salt of dimerized acids of soy oil with a 21% trimeric content. | 7 Z; 35 K | 6 Z; 30 K | 8 Z; 10 K | | 21 | 1 |
| 13. Neutral triethanol amine salt of dimerized acids of soy oil with a 21% trimeric content. | 7 Z; 40 K | 7 Z; 30 K | 8 Z; 10 K | | 22 | 1 |
| 14. Neutral triethanol amine salt of dimerized acids of linseed oil with a 24% trimeric content. | 6 Z: 40 K | 7 Z; 30 K | 9 Z; 10 K | | 22 | 1 |
| 15. Neutral triethanol amine salt of dimerized oleic acids with a 16% trimeric content. | 7 Z; 50 K | 6 Z; 45 K | 6 Z; 25 K | 7 Z; 10 K | 25 | 2–3 |
| 16. Neutral cyclohexyl amine salt of dimerized acids of cottonseed oil with a 20% trimeric content. | 6 Z; 40 K | 8 Z; 30 K | 8 Z; 10 K | | 22 | 1 |
| 17. Neutral morpholine salt of dimerized acids of soy oil with a 21% trimeric content. | 7 Z; 35 K | 7 Z; 25 K | 7 Z; 10 K | | 21 | 1 |
| 18. Without addition | 11 Z; 60 K | 9 Z; 40 K | 11 Z; 25 K | 12 Z; 15 K | 43 | 4 |

*1=very good. 2=good. 3=moderate. 4=poor.
Z=Required grinding time; K=Grain size, $\mu$.

For the second series of tests a paste of the following composition was used:

| | Parts by weight |
|---|---|
| Manganese violet dye | 60 |
| Linseed oil varnish | 200 |

The results obtained are given in Table IV.

TABLE IV

| Grinding Agents | Required Grinding Passes | | | | Total grinding time in minutes | Evaluation* |
|---|---|---|---|---|---|---|
| | 1 | 2 | 3 | 4 | | |
| 1. Nonylphenol ethoxylated with 4 mols ethylene oxide | 7 Z; 35 K | 13 Z; 10 K | | | 20 | 1 |
| 2. Nonylphenol ethoxylated with 8-9 mols ethylene oxide | 7 Z; 40 K | 11 Z; 25 K | 13 Z; 10 K | | 31 | 4 |
| 3. Nonylphenol ethoxylated with 9 mols ethylene oxide and propoxylated with 10 mols of propylene oxide. | 10 Z; 45 K | 9 Z; 25 K | 11 Z; 10 K | | 30 | 4 |
| 4. Triethanolamine salt of acid cetyl alcohol sulfate | 10 Z; 45 K | 9 Z; 30 K | 13 Z; 10 K | | 32 | 4 |
| 5. N-cocoalkyl-β-amino butyric acid | 10 Z; 35 K | 11 Z; 25 K | 11 Z; 10 K | | 33 | 4 |
| 6. Tallow propylene diamine dioleate | 10 Z; 40 K | 14 Z; 10 K | | | 24 | 2 |
| 7. Neutral cocoalkyl-amine salt of dimerized acids of soy oil with a 21% trimeric content. | 9 Z; 25 K | 11 Z; 10 K | | | 20 | 1 |
| 8. Neutral cocoalkyl-amine salt of dimerized acid of cottonseed oil with a 20% trimeric content. | 8 Z; 30 K | 11 Z; 10 K | | | 19 | 1 |
| 9. Acid cocoalkyl-amine salt of dimerized acids of soy oil with a 21% trimeric content. | 8 Z; 45 K | 9 Z; 30 K | 10 Z; 10 K | | 27 | 3 |
| 10. Neutral dimethyl cocoalkyl amine salt of dimerized acids of soy oil with a 21% trimeric content. | 9 Z; 35 K | 12 Z; 10 K | | | 21 | 1 |
| 11. Neutral benzylamine salt of dimerized acids of cottonseed oil with a 20% trimeric content. | 10 Z; 35 K | 13 Z; 10 K | | | 23 | 2 |
| 12. Neutral diethylene triamine salt of dimerized acids of soy oil with a 21% trimeric content. | 10 Z; 30 K | 11 Z; 10 K | | | 21 | 1 |
| 13. Neutral triethanol amine salt of dimerized acids of soy oil with a 21% trimeric content. | 8 Z; 30 K | 12 Z; 10 K | | | 20 | 1 |
| 14. Neutral triethanol amine salt of dimerized acids of linseed oil with a 24% trimeric content. | 9 Z; 25 K | 13 Z; 10 K | | | 22 | 1-2 |
| 15. Neutral triethanol amine salt of dimerized oleic acids with a 16% trimeric content. | 8 Z; 45 K | 8 Z; 30 K | 9 Z; 10 K | | 25 | 2-3 |
| 16. Neutral cyclohexyl amine salt of dimerized acids of cottonseed oil with a 20% trimeric content. | 9 Z; 25 K | 12 Z; 10 K | | | 21 | 1 |
| 17. Neutral morpholine salt of dimerized acids of soy oil with a 21% trimeric content. | 8 Z; 30 K | 14 Z; 10 K | | | 22 | 1-2 |
| 18. Without addition | 8 Z; 50 K | 10 Z; 30 K | 10 Z; 20 K | 11 Z; 10 K | 39 | 4 |

*1=very good. 2=good. 3=moderate. 4=poor.
Z=Required grinding time; K=Grain size, μ.

The composition of the pigment paste for the third series of tests was:

| | Parts by weight |
|---|---|
| "Sico-fast scarlet 22M" dye | 70 |
| Linseed oil varnish | 200 |

The grinding test results are reported in Table V.

TABLE V

| Grinding Agents | Required Grinding Passes | | | | Total grinding time in minutes | Evaluation* |
|---|---|---|---|---|---|---|
| | 1 | 2 | 3 | 4 | | |
| 1. Nonylphenol ethoxylated with 4 mols of ethylene oxide | 9 Z; 45 K | 10 Z; 30 K | 9 Z; 10 K | | 28 | 3 |
| 2. Nonylphenol ethoxylated with 8-9 mols ethylene oxide | 10 Z; 35 K | 13 Z; 25 K | 13 Z; 10 K | | 36 | 4 |
| 3. Nonylphenol ethoxylated with 8-9 mols ethylene oxide and propoxylated with 10 mols of propylene oxide. | 12 Z; 35 K | 14 Z; 20 K | 15 Z; 10 K | | 41 | 4 |
| 4. Triethanolamine salt of acid cetyl alcohol sulfate | 14 Z; 35 K | 14 Z; 25 K | 12 Z; 10 K | | 40 | 4 |
| 5. N-cocoalkyl-β-amino butyric acid | 10 Z; 40 K | 11 Z; 25 K | 12 Z; 10 K | | 33 | 3-4 |
| 6. Tallow propylene diamine dioleate | 9 Z; 40 K | 6 Z; 30 K | 7 Z; 10 K | | 22 | 1-2 |
| 7. Neutral cocoalkyl-amine salt of dimerized acids of soy oil with a 21% trimeric content. | 8 Z; 30 K | 11 Z; 10 K | | | 19 | 1 |
| 8. Neutral cocoalkyl-amine salt of dimerized acids of cottonseed oil with a 20% trimeric content. | 9 Z; 30 K | 11 Z; 10 K | | | 20 | 1 |
| 9. Acid cocoalky -amine salt of dimerized acids of soy oil with a 21% trimeric content. | 9 Z; 45 K | 10 Z; 30 K | 12 Z; 10 K | | 31 | 3 |
| 10. Neutral dimethyl cocoalkyl-amine salt of dimerized acids of soy oil with a 21% trimeric content. | 8 Z; 30 K | 12 Z; 10 K | | | 20 | 1 |
| 11. Neutral benzylamine salt of dimerized acid of cottonseed oil with a 20% trimeric content. | 8 Z; 40 K | 7 Z; 30 K | 9 Z; 10 K | | 24 | 2 |
| 12. Neutral diethylene triamine salt of dimerized acids of soy oil with a 21% trimeric content. | 9 Z; 35 K | 5 Z; 20 K | 8 Z; 10 K | | 22 | 1-2 |
| 13. Neutral triethanol amine salt of dimerized acids of soy oil with a 21% trimeric content. | 7 Z; 35 K | 13 Z; 10 K | | | 20 | 1 |
| 14. Neutral triethanol amine salt of dimerized acids of linseed oil with a 24% trimeric content. | 8 Z; 35 K | 9 Z; 25 K | 7 Z; 10 K | | 23 | 2 |
| 15. Neutral triethanol amine salt of dimerized oleic acids with a 16% trimeric content. | 8 Z; 35 K | 8 Z; 25 K | 9 Z; 10 K | | 25 | 2-3 |
| 16. Neutral cyclohexyl amine salt of dimerized acids of cottonseed oil with a 20% trimeric content. | 8 Z; 35 K | 7 Z; 25 K | 7 Z; 10 K | | 22 | 1-2 |
| 17. Neutral morpholine salt of dimerized acid of soy oil with a 21% trimeric content. | 9 Z; 35 K | 12 Z; 10 K | | | 21 | 1 |
| 18. Without addition | 14 Z; 45 K | 12 Z; 30 K | 15 Z; 10 K | | 41 | 4 |

*1=very good. 2=good. 3=moderate. 4=poor.
Z=Required grinding time; K=Grain size, μ.

To conduct the fourth series of tests, a pigment paste of the following composition was used:

| | Parts by weight |
|---|---|
| "Benzydine-yellow GR" | 50 |
| Linseed oil varnish | 100 |

Table VI shows the grinding values obtained:

TABLE VI

| Grinding Agents | Required Grinding Passes | | | Total Grinding time in minutes | Evaluation* |
|---|---|---|---|---|---|
| | 1 | 2 | 3 | | |
| 1. Nonylphenol ethoxylated with 4 mols of ethylene oxide | 9Z; 35 K | 10 Z; 10 K | | 19 | 3 |
| 2. Nonylphenol ethoxylated with 8-49 mols of ethylene oxide | 13 Z; 30 K | 10 Z; 10 K | | 23 | 4 |
| 3. Nonylphenol ethoxylated with 9 mols of ethylene oxide and propoxylated with 10 mols of propylene oxide. | 13 Z; 35 K | 13 Z; 10 K | | 26 | 4 |
| 4. Triethanolamine salt of acid cetyl alcohol sulfate | 12 Z; 40 K | 12 Z; 40 K | 12 Z; 10 K | 24 | 4 |
| 5. N-cocoalkyl-β-amino butyric acid | 10 Z; 35 K | 10 Z; 10 K | | 20 | 3 |
| 6. Tallow propylene diamine dioleate | 7 Z; 30 K | 7 Z; 10 K | | 14 | 1-2 |
| 7. Neutral cocoalkyl-amine salt of dimerized acids of soy oil with a 21% trimeric content. | 6 Z; 30 K | 5 Z; 10 K | 6 Z:; 10 K | 11 | 1 |
| 8. Neutral cocoalkylamine salt of dimerized acids of cottonseed oil with a 20% trimeric content. | 6 Z; 30 K | 6Z; 10 K | | 12 | 1 |
| 9. Acid cocoalkylamine salt of dimerized acids of soy oil with 21% trimeric content. | 7 Z; 35 K | 11Z; 10 K | | 18 | 3 |
| 10. Neutral dimethylcocoalkyl-amine salt of dimerized acids of soy oil with a 21% content. | 5 Z; 30 K | 7 Z; 10 K | | 12 | 1 |
| 11. Neutral benzylamine salt of dimerized acids of cottonseed oil with a 21% trimeric content. | 7 Z; 35 K | 8 Z; 10 K | | 15 | 2 |
| 12. Neutral benzylamine salt of dimerized acids of cottonseed oil with a 21% trimeric content. | 6 Z; 30 K | 6 Z; 10 K | | 12 | 1 |
| 13. Neutral triethanol amine salt of dimerized acids of soy oil with a 21% trimeric content. | 6 Z; 30 K | 5 Z; 10 K | | 11 | 1 |
| 14. Neutral triethanol amine salt of dimerized acids of linseed oil with a 24% trimeric content. | 7Z; 35 K | 6 Z; 10 K | | 13 | 1-2 |
| 15. Neutral triethanol amine salt of dimerized oleic acids with a 16% trimeric content. | 7 Z; 35 K | 7 Z; 10 K | | 14 | 1-2 |
| 16. Neutral cyclohexyl amine salt of dimerized acids of cotton seed oil with a 20% trimeric content. | 6 Z; 30 K | 6 Z; 10 K | | 12 | 1 |
| 17. Neutral morpheline salt of dimerized acids of soy oil with a 21% trimeric content. | 7 Z; 35 K | 6 Z; 10 K | | 13 | 1-2 |
| 18. Without addition | 13 Z; 35 K | 13 Z; 10 K | | 26 | 4 |

*1=Very good. 2=good. 3=moderate. 4=poor.
Z=Required grinding time, (min.); K=Grain size, μ.

As Tables III to VI clearly show, the amine salts of dimerized fatty acids, and in particular, the neutral cocoalkyl amine salts of dimerized soy- and cottonseed oil fatty acids exhibit by far the best and the most uniform effect, as compared with known nitrogen derivatives of natural fatty acids which produce only a moderate improvement. The other grinding agents, which were used for comparison purposes, belonging to the group of the alkylene oxide addition products, and amine salts of alkylsulfates showed, in general, only a slight effectiveness.

Besides the dispersion effect noted in Tables III to VI, some of the colors proved to be resistant to the prolonged corrosion test in a salt spray apparatus due to the addition product of the present invention. The more favorable results in regard to corrosion resistance were obtained with products 6, 7, 8, 10, 11, 12 and 16.

Example IV

To demonstrate the utility of the agents of the present invention in regard to the "floating out in horizontal direction" phenomena the following base composition was used:

| | Parts by weight |
|---|---|
| Long-chain alkyd resin oil with a 67% content of linseed oil (Alkydal L extra[1]), 60% solution in mineral spirits | 50.0 |
| Long-chain alkyd resin oil with a 64% content of linseed oil, (Alkydal LM 63[1]), 100% | 11.5 |
| Maleinate resin (Alresat 313 c P[1]), 50% solution in xylol | 5.5 |
| Mineral spirits K30[1] | 25.0 |
| Decalin | 3.2 |
| Dipentene | 3.2 |
| Anti-skinning agent | 0.3 |
| Dry cobalt-lead naphthenate (Soligen Co. Pb[1]) | 1.3 |
| Titanium dioxide | 30.0 |
| Carbon black 400 | 2.0 |

[1] Trademark.

Into the above composition the following agents were added:

A1: blank test without addition agents
A2: neutral cocoalkyl-amine salt of dimerized acids of soy oil with a 21% trimeric content
A3: dioleate of tallow propylene diamine (commercial product Duomeen TDO[1])
A4: salt of a varnish-tolerant high-molecular acid with a varnish-tolerant long-chain base (commercial product Antiterra U[1])
A5: soy lecithin
A6: methylpolysiloxane (commercial product Silicone oil Bayer A[1])

[1] Trademark.

The test substances were added in an amount of 1%, by weight, based on pigment, with the exception of the silicone oil which was used in an amount of only 0.02%. Each of the agents were worked into the base composition during the grinding process on the roller mill. The milled products were sprayed onto sheet steel and after being dried were photographed at about 100 fold magnification.

The tests showed very distinctly the differences in the formation of "Benard-cells," their frequency being a measure for the extent of the floating effect. The product A2, of the present invention, as well as the methylpolysiloxane (A6) show by far the most favorable effect. However, A2 is superior in regard to color distribution, and beyond this it did not exhibit the deteriorations in adhesive strength during the coating process which always occur when using silicone oils. A slight improvement was obtained with A3, whereas A4 and A5 showed no effect at all.

Example V

To demonstrate the flooding effect or what is termed "floating out in vertical direction" the following varnish system proved suitable, as it exhibited a pronouncedly strong flooding effect:

28 parts by weight phenyl modified colophony (Albertol III L[1]) were boiled with
21 parts by weight wood oil and
7 parts by weight linseed oil

[1] Trademark.

at a temperature of 180 to 200° C. for 20 minutes. After this mixture had been cooled sufficiently, it was admixed with:

| | Parts by weight |
|---|---|
| Mineral spirits "K 30" | 41.8 |
| Anti-skinning agent | 0.6 |
| Dry cobalt-lead-naphthenate | 0.6 |

For purpose of pigmentation,

| | Parts by weight |
|---|---|
| Titanium dioxide | 27 |
| Iron oxide yellow | 2 |
| Iron oxide black | 6 |

were added to 100 parts by weight of the lacquer obtained.

The agents preventing the flooding out, which were to be tested, were worked in during pigment grinding at an amount of 1% based on the pigment, with the exception of the silicone oil employed for comparison, which was used only at an amount of 0.02% based on the pigment. The products obtained were applied onto glass sheets and tested in regard to color differentiations between top- and bottom surface of the dry lacquer film. The differences in the colors are characteristics for the flooding effect.

The individual comparison products have the designation B1–B6; they correspond in sequence and nature of the products with those listed in Example IV as A1 to A6.

The amine salt of the dimerized fatty acid B2 of the invention showed almost no difference in color and consequently it possessed by far the most favorable effectiveness as an agent for anti-flooding. A slight improvement was noted in the products B3 and B4, while the products B5 and B6 displayed hardly any difference compared with the blank test B1.

The lacquer samples, prepared with the various test substances, were held for several days in test tubes; thereafter, the separation of the pigment constituents were appraised. Due to the flooding effect, the variously colored pigments separated distinctly. This separtion into irregularly colored layers could be evaluated as a measure of the extent of the effect. The designation of the individual test tubes was C1 to C6, corresponding with the sequence and nature of the products listed in Example IV under A1 to A6.

The tests proved distinctly, that the lacquer C2, prepared by using the amino salt of dimerized fatty acid, displayed the least separation and that, in other respects, the product of the invention was highly effective as an agent for preventing flooding. In all other cases an extensive separation of the pigments followed, and hardly a difference was noted in comparison to the blank test C1.

Example VI

For comparison the same composition as in Example II was employed using the test substances listed in Table VII. The amounts added were based on the pigment. It could be concluded from the corresponding tests, that only when the amino salts of dimerized fatty acids were used, did the top and bottom surfaces of the color films display no differentiation in color tone. In other words, only the products of the present invention were suitable as effective agents for preventing the floating out. In the commercial products, which were employed for comparison, the difference in color, compared with the blank test, was hardly diminished.

TABLE VII

| Test | Additive | Effect |
|---|---|---|
| B 1 | Blank test | 4 |
| B 2 | 1% neutral cocoalkyl-amine salt of dimerized acids of soy oil with a 21% trimeric content. | 1 |
| B 3 | 1% dioleate of tallow propylene diamine (commercial product). | 4 |
| B 4 | 1% salt of high-molecular acid with a long-chain base (commercial product). | 4 |
| B 5 | 1% soy lecithin (commercial product) | 3 |
| B 6 | 0.02% methylpolysiloxane (commercial product) | 4 |
| B 7 | 1% neutral cocoalkyl-amine salt of dimerized acids of soy oil+0.02% methylpolysiloxane. | *1 |
| B 8 | Neutral octyl amine salt of dimeric linseed oil fatty acid with a 24% trimeric content. | 1 |
| B 9 | Neutral dodecylamine salt of dimeric linseed oil fatty acid with a 24% trimeric content. | 1 |
| B 10 | Neutral octadecylamine salt of dimeric linseed oil fatty acid with a 24% trimeric content. | 1 |
| B 11 | Neutral tetradecylamine salt of dimeric oleic acid with a 16% trimeric content. | 1 |
| B 12 | Neutral octadecylamine salt of dimeric oleic acid with a 16% trimeric content. | 1 |
| B 13 | Neutral cocoalkyl-amine salt of dimerized acids of cottonseed oil with a 20% trimeric content. | 1 |
| B 14 | Neutral cocoalkyl-amine salt of dimeric oleic acid with a 16% trimeric content. | 1 |

*Pitting.
1=floating out hardly noticeable.
4=very pronounced floating out.

While certain specific examples and preferred modes of practice of the invention have been set forth it will be understood that this is solely for the purpose of illustration and that various changes and modifications may be made without departing from the spirit of the disclosure and the scope of the appended claims.

We claim:

1. A pigment suspension consisting essentially of a pigment suspended in an organic solvent and 0.05 to 5% by weight based on the pigment of an amine salt of dimers of unsaturated fatty acids of 11 to 22 carbon atoms, the amine salt being derived from an amine selected from the group consisting of pyridine, quinoline and amine of the formula

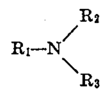

wherein $R_1$ and $R_2$ are selected from the group consisting of hydrogen, alkyl of 1 to 22 carbon atoms, hydroxy lower alkyl, amino lower alkyl, alkyl amino lower alkyl of 3 to 25 carbon atoms, phenyl and cyclo hexyl and when taken together with the nitrogen atom, form a heterocyclic selected from the group consisting of piperidino, morpholino and piperazino and $R_3$ is selected from the group consisting of hydrogen, alkyl of 1 to 22 carbon atoms and hydroxyl lower alkyl, at least one of said R's being other than hydrogen.

2. A composition according to claim 1, wherein said salt is neutral.

3. A composition according to claim 2, wherein the amine moiety of said neutral salt is derived from an aliphatic amine having from 12 to 18 carbon atoms.

4. A composition according to claim 3, wherein said aliphatic amine is derived from coconut fatty acid.

5. A composition according to claim 4 wherein the dimerized acid moiety of said neutral salt is derived from a member selecter from the group consisting of soy oil fatty acid and cottonseed oil fatty acid.

6. In a process for preparing pigment suspensions in organic solvents, the improvement which comprises adding to said pigment suspensions in organic solvents from about 0.05 to 5% by weight based on the pigment of an amine salt of dimers of unsaturated fatty acids of 11 to 22 carbon atoms, the amine salt being derived from an amine selected from the group consisting of pyridine, quinoline and amine of the formula

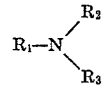

wherein $R_1$ and $R_2$ are selected from the group consisting of hydrogen, alkyl of 1 to 22 carbon atoms, hydroxy lower alkyl, amino lower alkyl, alkyl amino lower alkyl of 3 to 25 carbon atoms, phenyl and cyclo hexyl and when taken together with the nitrogen atom, form a heterocyclic selected from the group consisting of piperidino, morpholino and piperazino and $R_3$ is selected from the group consisting of hydrogen, alkyl of 1 to 22 carbon atoms and hydroxyl lower alkyl, at least one of said R's being other than hydrogen.

7. The process according to claim 6, wherein said salt is neutral.

8. The process according to claim 6, wherein said amine is derived from coconut fatty acid.

9. The process according to claim 8, wherein the dimerized acid moiety of said neutral salt is derived from a member selected from the group consisting of soy oil fatty acid and cottonseed oil fatty acid.

References Cited

UNITED STATES PATENTS

| | | | |
|---|---|---|---|
| 3,075,849 | 1/1963 | Dreher et al. | 106—308 |
| 3,288,621 | 11/1966 | Barron et al. | 106—288 |

TOBIAS E. LEVOW, *Primary Examiner.*

JAMES E. POER, *Examiner.*